United States Patent
Riley (10) Patent No.: US 9,825,583 B1
(45) Date of Patent: Nov. 21, 2017

(54) PORTABLE SOLAR ENERGY SYSTEM

(71) Applicant: Carl Riley, Tucson, AZ (US)

(72) Inventor: Carl Riley, Tucson, AZ (US)

( * ) Notice: Subject to any disclaimer, the term of this patent is extended or adjusted under 35 U.S.C. 154(b) by 428 days.

(21) Appl. No.: 14/550,669

(22) Filed: Nov. 21, 2014

Related U.S. Application Data (60) Provisional application No. 61/907,112, filed on Nov. 21, 2013.

(51) Int. Cl.
*H01L 31/045* (2006.01)
*H02S 30/20* (2014.01)

(52) U.S. Cl.
CPC .................................... *H02S 30/20* (2014.12)

(58) Field of Classification Search
CPC .......... H02S 10/40; H02S 30/20; H02S 20/00; H01L 31/042; H02J 7/355
USPC ............. 136/242–265; 29/890.033; 320/101, 320/107–115; 257/E27.125
See application file for complete search history.

(56) References Cited

U.S. PATENT DOCUMENTS

| | | | |
|---|---|---|---|
| 6,380,710 B1 * | 4/2002 | Watanabe | H01L 31/03921 257/E27.125 |
| 2006/0028166 A1 * | 2/2006 | Closset | H02J 7/355 320/101 |
| 2011/0017262 A1 * | 1/2011 | Oppizzi | F21L 4/027 136/245 |
| 2012/0090660 A1 * | 4/2012 | Keller | B64G 1/222 136/245 |

* cited by examiner

*Primary Examiner* — Keith Hendricks
*Assistant Examiner* — Kourtney S Carlson (57) ABSTRACT

A solar energy system for portably providing solar energy features a base unit having a base cavity located therein. A cable notch and an annular panel notch are located on a base side wall. A base first end or a base second end features an opening located therein featuring a first end cap or a second end cap located thereon. The system features power inverter located in the base cavity operatively connected to a power storage component and a solar controller. The system features a solar panel wrapped around the panel notch of the base unit. The solar panel is operatively connected to the solar controller, the power inverter, and the power storage component via cables for operation.

15 Claims, 11 Drawing Sheets

PORTABLE SOLAR ENERGY SYSTEM

CROSS REFERENCE

This application claims priority to U.S. Patent Application No. 61/907,112, filed Nov. 21, 2013, the specification(s) of which is/are incorporated herein in their entirety by reference.

FIELD OF THE INVENTION

The present invention relates to portable solar energy systems.

BACKGROUND OF THE INVENTION

Solar energy, or energy harness from the sun, has been around for many years. Although a viable source of energy, there are challenges with efficiently harnessing solar energy and additional challenges when attempting to harness solar energy using a portable system. The present invention features a solar energy system for portably providing solar energy.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a solar energy system for portably providing solar energy. In some embodiments, the system comprises a base unit having a base cavity located therein. In some embodiments, the base unit comprises a cable notch and an annular panel notch located on a base side wall. In some embodiments, a base first end or a base second end comprises an opening located therein. In some embodiments, the opening comprises a first end cap or a second end cap located thereon.

In some embodiments, the system comprises a power storage component located in the base cavity.

In some embodiments, the system comprises a solar controller located in the base cavity operatively connected to the power storage component.

In some embodiments, the system comprises a power inverter located in the base cavity operatively connected to the power storage component and the solar controller.

In some embodiments, the system comprises a solar panel. In some embodiments, the solar panel is wrapped around the panel notch of the base unit. In some embodiments, the solar panel is operatively connected to the solar controller, the power inverter, and the power storage component via cables.

In some embodiments, for operation, the first end cap or the second end cap is loosened or removed for ventilation and connective access. In some embodiments, the solar panel is unrolled from the base unit and placed in contact with sunlight to receive energy from the sun. In some embodiments, the solar panel converts the energy from the sun to an electrical charge. In some embodiments, an energy using device is connected to the system for power usage.

In some embodiments, for storage, the cables are detached and wrapped around the cable notch of the base unit. In some embodiments, the solar panel is wrapped around the panel notch of the base unit. In some embodiments, the solar panel is secured in place around the base unit. In some embodiments, the first end cap or the second end cap is replaced.

DESCRIPTION OF PREFERRED EMBODIMENTS

Following is a list of elements corresponding to a particular element referred to herein:
100 Solar energy system
110 Base unit
111 Base first end
112 Base second end
113 Base midpoint 114 Base side wall
115 Base cavity
116 First diameter
117 First end cap
118 Second end cap
130 Cable notch
131 Cable notch diameter
135 Panel notch
136 Panel notch diameter
140 Power storage component
141 Solar controller
142 Power inverter
143 Solar panel
144 Cable
150 Mounting handle
151 Cylindrical cavity
152 Axle rod
153 Stationary mount
154 Flexible pad
160 Rail
170 Double-sided end cap Referring now to FIG. 1-12, the present invention features a solar energy system (100) for portably providing solar energy. In some embodiments, the system (100) comprises a base unit (110) having a base cavity (115) located therein. In some embodiments, the base unit (110) comprises a cable notch (130) and an annular panel notch (135) located on a base side wall (114). In some embodiments, the base unit (110) comprises an annular panel notch (135) located on a base side wall (114). In some embodiments, a base first end (111) or a base second end (112) comprises an opening located therein. In some embodiments, the opening comprises a first end cap (117) or a second end cap (118) located thereon.

In some embodiments, the system (100) comprises a power storage component (140) located in the base cavity (115).

In some embodiments, the system (100) comprises a solar controller (141) located in the base cavity (115) operatively connected to the power storage component (140) and a power inverter (142).

In some embodiments, the system (100) comprises a power inverter (142) located in the base cavity (115) operatively connected to the power storage component (140) and the solar controller (141).

In some embodiments, the system (100) comprises a solar panel (143). In some embodiments, the solar panel (143) is wrapped around the panel notch (135) of the base unit (110). In some embodiments, the solar panel (143) is operatively connected to the solar controller (141), the power inverter (142), and the power storage component (140) via cables (144).

In some embodiments, for operation, the first end cap (117) or the second end cap (118) is loosened or removed for ventilation and connective access.

In some embodiments, the solar panel (143) is unrolled from the base unit (110) and placed in contact with sunlight to receive energy from the sun. In some embodiments, the solar panel (143) converts the energy from the sun to a direct current electrical current. In some embodiments, the solar panel (143) is connected to the solar controller (141) via the cables (144). In some embodiments, the solar controller (141) is connected to a power storage component (140) and a power inverter (142). In some embodiments, the direct current electrical current produced by the solar array (143) is regulated via the solar controller (141) for input into the power storage component (140). In some embodiments, the electrical current output from the solar panel (143) is regulated by the solar converter and connected to the power inverter (142), which converts the direct electrical current to an alternating electrical current. In some embodiments, an electrical current output from the power storage component (140) is regulated via the solar controller (141) and connected to the power inverter (142), which converts the direct electrical current to an alternating electrical current. In some embodiments, an energy using device that consumes alternating current power is connected to the power inverter (142).

In some embodiments, the solar controller (141) comprises an output for attachment to a power storage component (140). In some embodiments, the solar controller comprises an output which supplies direct current power. In some embodiments, the solar controller comprises two outputs, one which supplies a controlled voltage and current for charging a battery, and one which supplies direct current power.

In some embodiments, for storage, the cables (144) are detached from the power inverter (142) and wrapped around the cable notch (130) of the base unit (110). In some embodiments, the solar panel (143) is wrapped around the panel notch (135) of the base unit (110). In some embodiments, the solar panel (143) is secured in place around the base unit (110). In some embodiments, the first end cap (117) or the second end cap (118) is replaced.

In some embodiments, the present invention features a solar energy system (100) for portably providing solar energy. In some embodiments, the system (100) comprises a tubular base unit (110) having a base first end (111), a base second end (112), a base midpoint (113) between the base first end (111) and the base second end (112), a base side wall (114), and a base cavity (115) located therein. In some embodiments, the base cavity (115) comprises a plurality of elevated rails (160) located therein. In some embodiments, the base unit (110) comprises a first diameter (116) at both the base first end (111) and the base second end (112).

In some embodiments, the base unit (110) comprises an annular cable notch (130) comprising a cable notch diameter (131) located on the base side wall (114), In some embodiments, the cable notch (130) is located at the base midpoint (113).

In some embodiments, the base unit (110) comprises a plurality of annular panel notches (135), each comprising a panel notch diameter (136) located on the base side wall (114). In some embodiments, a first panel notch (135) is located between the base first end (111) and the cable notch (130). In some embodiments, a second panel notch (135) is located between the base second end (112) and the cable notch (130). In some embodiments the combined width of the plurality of annular panel notches (135) and the cable notch (130) is larger than a solar panel width. In some embodiments, the cable notch diameter (131) is smaller than the panel notch diameter (136). In some embodiments, the panel notch diameter (136) is smaller than the first diameter (116).

In some embodiments, the base unit (110) is symmetrical. In some embodiments, the base first end (111) comprises a first end cap (117) threadably located thereon and sealed via an o-ring. In some embodiments, the base second end (112) comprises a second end cap (118) threadably located thereon and sealed via an o-ring.

In some embodiments, the cable notch (130) is a groove between ¼ inch and 1 inch wide. In some embodiments, the cable notch (130) is a groove between 1 inch and 2 inches wide. In some embodiments, the cable notch (130) is a groove greater than 2 inches wide.

In some embodiments, the system (100) comprises a power storage component (140) located in the base cavity (115) via the elevated rails (160) close to the base midpoint (113). In some embodiments the power storage component (140) is a battery. Power storage components (140) are well known to those of ordinary skill in the art. In some embodiments, the power storage component (140) comprises nickel metal hydride, lithium iron phosphate, titanium dioxide based anodes, acid glass mat (AGM), or gel acid.

In some embodiments, the system (100) comprises a solar controller (141) located in the base cavity (115) via the elevated rails (160) close to the base first end (111). In some embodiments, the solar controller (141) is operatively connected to the power storage component (140). In some embodiments, the solar controller (141) limits the rate that an electric current is added to or drawn from the power storage component (140). Solar controllers (141) are well known to those or ordinary skill in the art.

In some embodiments, the system (100) comprises a power inverter (142) located in the base cavity (115) via the elevated rails (160) close to the base second end (112). In some embodiments, the power inverter (142) is operatively connected to the power storage component (140) and the solar controller (141). In some embodiments, the power inverter (142) or photovoltaic inverter converts a direct current output from a solar panel (143) to alternating current output for use by a load. Power inverters (142) are well known to those of ordinary skill in the art.

In some embodiments, the system (100) comprises a flexible solar panel (143). In some embodiments, the solar panel (143) is wrapped around the panel notches (135) of the base unit (110). In some embodiments, the solar panel (143) is operatively connected to the solar controller (141), the power inverter (142), and the power storage component (140) via attachable and detachable cables (144). In some embodiments, the cables are wires. Flexible solar panels (143) are well known to those of ordinary skill in the art.

In some embodiments, for operation, at least the first end cap (117) or the second end cap (118) is loosened for ventilation and connective access. In some embodiments, the solar panel (143) is unrolled from the base unit (110) and placed in contact with sunlight to receive energy from the sun. In some embodiments, the solar panel (143) converts the energy from the sun to an electrical charge. In some embodiments, the solar panel (143) is connected to the power inverter (142) via the attachable and detachable cables (144) through the opening on the base first end (111) or the base second end (112). In some embodiments, an electrical charge output from the solar panel (143) is converted to an alternating electrical current via the power inverter (142). In some embodiments, a alternating current energy using device is connected to the power inverter (142) output for power usage.

In some embodiments, for operation, at least the first end cap (117) or the second end cap (118) is loosened for ventilation and connective access. In some embodiments, the solar panel (143) is unrolled from the base unit (110) and placed in contact with sunlight to receive energy from the sun. In some embodiments, the solar panel (143) converts the energy from the sun to an electrical charge. In some embodiments, the solar panel (143) is connected to the solar controller (141) via the attachable and detachable cables (144) through the opening on the base first end (111) or the base second end (112). In some embodiments, a direct current energy using device is connected to the solar controller (141) output for power usage.

In some embodiments, for operation, at least the first end cap (117) or the second end cap (118) is loosened for ventilation and connective access. In some embodiments, the solar panel (143) is unrolled from the base unit (110) and placed in contact with sunlight to receive energy from the sun. In some embodiments, the solar panel (143) converts the energy from the sun to an electrical charge. In some embodiments, the solar panel (143) is connected to the solar controller (141) via the attachable and detachable cables (144) through the opening on the base first end (111) or the base second end (112). In some embodiments, a power storage component is connected to the solar controller (141). In some embodiments, the alternating electrical current is regulated via the solar controller (141) for input into the power storage component (140).

In some embodiments, an electrical current output from the power storage component (140) is regulated via the solar controller (141). In some embodiments the solar controller output is connected to a power inverter (142). In some embodiments an electrical current output of the batter is regulated by the solar controller, and converted into alternating current by the power inverter (142). In some embodiments, an alternating current energy using device is connected to the power inverter (142) output for power usage. In some embodiments, the system (100) comprises electrical disconnect switches. In some embodiments, the system (100) comprises fused protection. In some embodiments, the system (100) comprises fuses. In some embodiments, the system (100) comprises overload fail-safe means. In some embodiments, the output is only direct current (DC) rather than alternating current (AC). In some embodiments, the power inverter (142) is not necessary. In some embodiments, the power inverter (142) is not necessary for larger outputs such as 24 volts, 48 volts, or more.

In some embodiments, for storage, the attachable and detachable cables (144) are detached from the power inverter (142) and wrapped around the cable notch (130) of the base unit (110). In some embodiments, the solar panel (143) is wrapped around the panel notches (135) of the base unit (110). In some embodiments, the solar panel (143) is secured in place around the base unit (110). In some embodiments, the first end cap (117) and the second end cap (118) are sealably tightened.

In some embodiments, the base unit (110) is cylindrical. In some embodiments, the base unit (110) comprises a shape of a rectangular or triangular prism. In some embodiments, a cross-section of the base unit (110) comprises a shape of a polygon, for example, a triangle, a square, a rectangle, a pentagon, a hexagon, etc. In some embodiments, the base unit (110) comprises an irregular shape, for example, the base unit (110) has one or more flat sides. In some embodiments, the base unit (110) can be any size, for example, small and easily portable by a single person, or large and portable by multiple persons or equipment.

In some embodiments, the system (100) further comprises a stand. In some embodiments, the stand is located on the base first end (111) or the base second end (112) to stably elevate the base unit (110) offset from a surface for ventilation. In some embodiments, the stand threadably inserts into the base first end (111) or the base second end (112). In some embodiments, a shock absorbing member is located around a base first end (111) or a base second end (112) for protection. In some embodiments, a channel is disposed around a base first end (111) or a base second end (112) to secure the shock absorbing member. In some embodiments, the shock absorbing member resembles a tire, or a rubber band.

In some embodiments, a threaded shoulder of the first end cap (117) or the second end cap (118) comprises a venting aperture located therein. In some embodiments, a threaded shoulder of the base first end (111) or the base second end (112) comprises a venting aperture disposed therein. In some embodiments, upon partial unscrewing of the first end cap (117) or the second end cap (118) the venting aperture allows airflow into and out of the base cavity (115).

In some embodiments, a first base unit (110) and a second base unit (110) are sequentially joined via a double-sided end cap (170). In some embodiments, the double-sided end cap (170) comprises first side external threads and second side external threads. In some embodiments, the external threads are mated to internal threads located on the base first end (111) or the base second end (112). In some embodiments, an unlimited number of base units (110) may be joined via double-sided end caps (170). In some embodiments, cables (144) may connect systems via a cap aperture located in the double-sided end cap (170). In some embodiments, the double-sided end cap (170) is elastomerically flexible. In some embodiments, the double-sided end cap (170) is flexible, for example, like a bellows. In some embodiments, the double-sided end cap (170) is an elbow. In some embodiments, the double-sided end cap (170) is a length of threaded pipe. In some embodiments, the double-sided end cap (170) is a coupling or coupler. In some embodiments, the double-sided end cap (170) can be any length. In some embodiments, the double-sided end cap (170) contains storage capacity for housing a power storage component (140), other equipment in the system (100), electronic equipment, or any item or combination of items.

Figure 1:
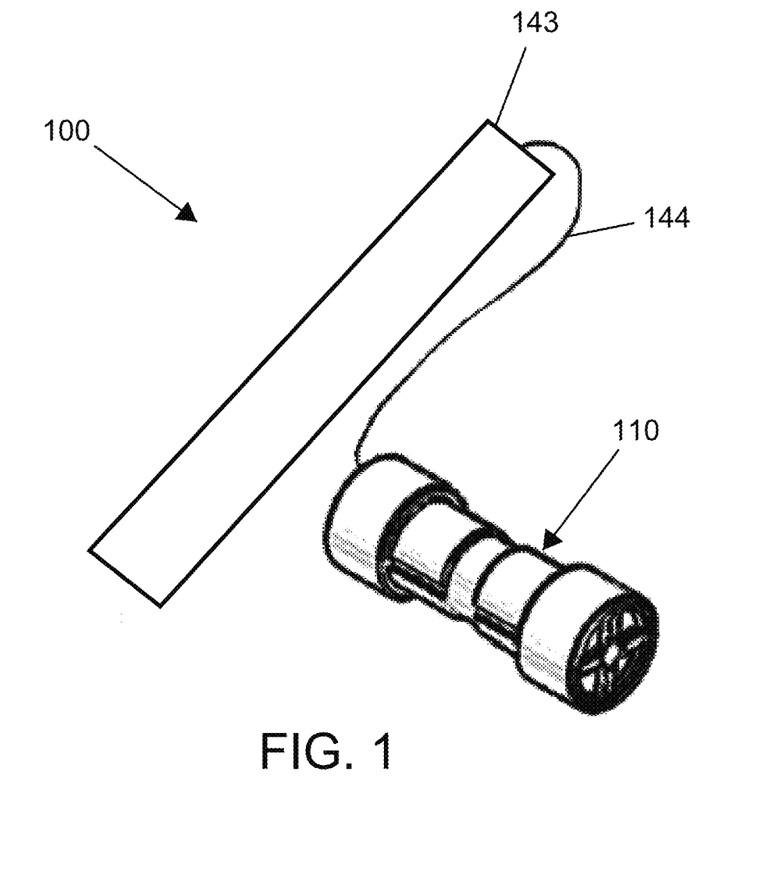
FIG. 1 shows a perspective view of the present invention.
Figure 2:
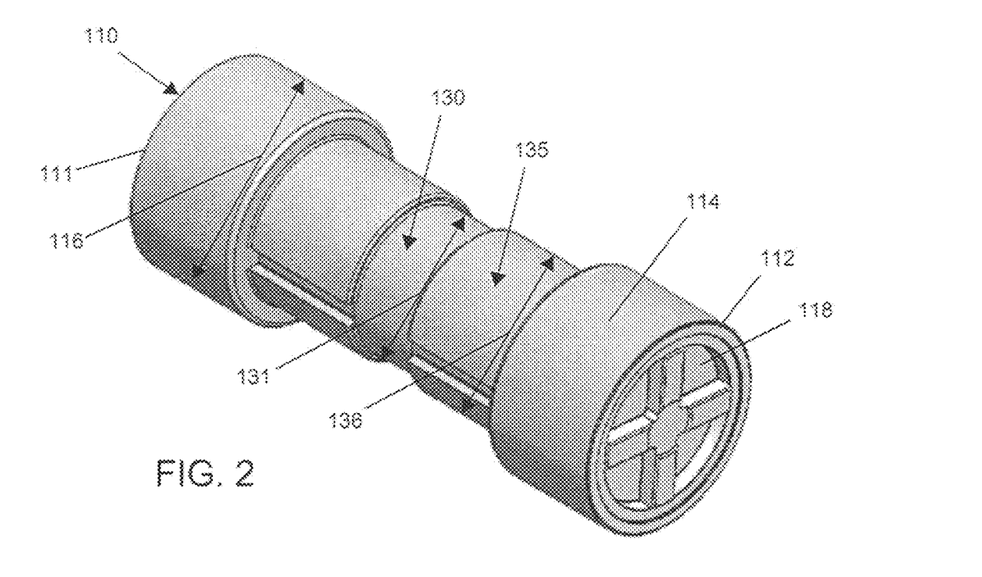
FIG. 2 shows a perspective view of the base unit of the present invention.
Figure 3A:
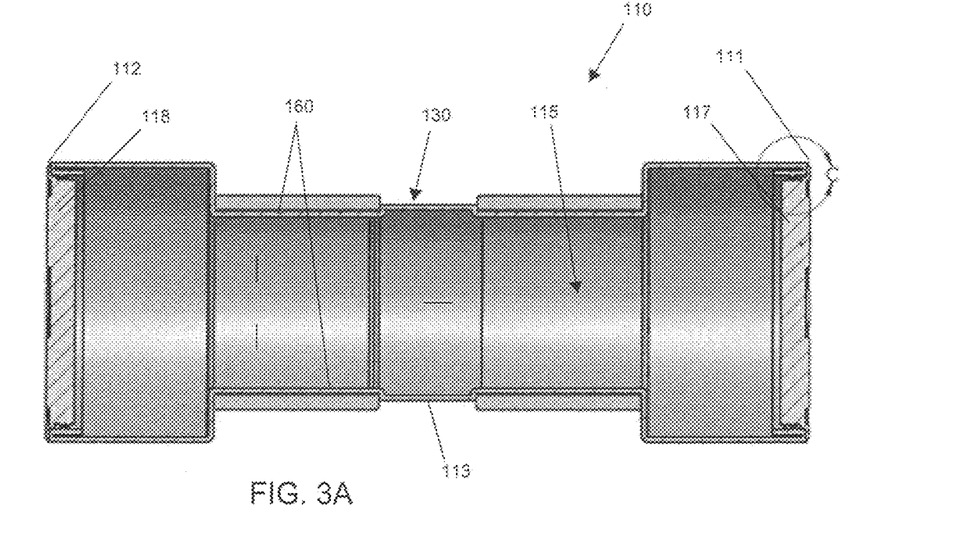
FIG. 3A shows a cross-sectional view of the base unit of the present invention.
Figure 3B:
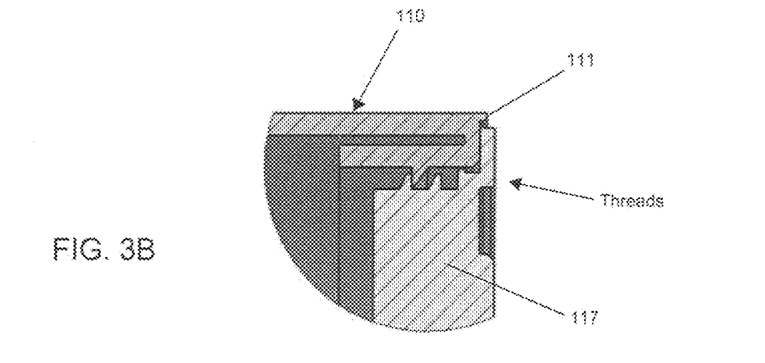
FIG. 3B shows a close-up view of a cross-section of the base unit of the present invention featuring an end cap connection to the base unit.
Figure 4:
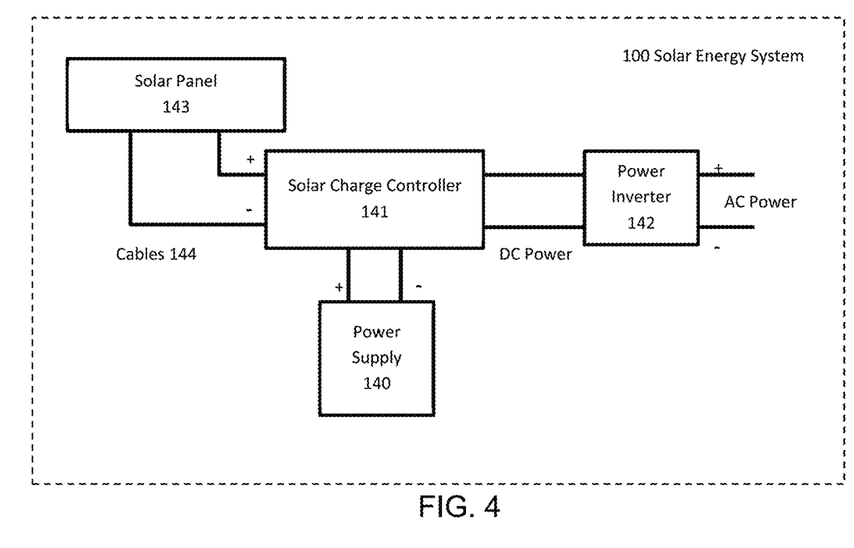
FIG. 4 shows a schematic of the present invention.
Figure 5:
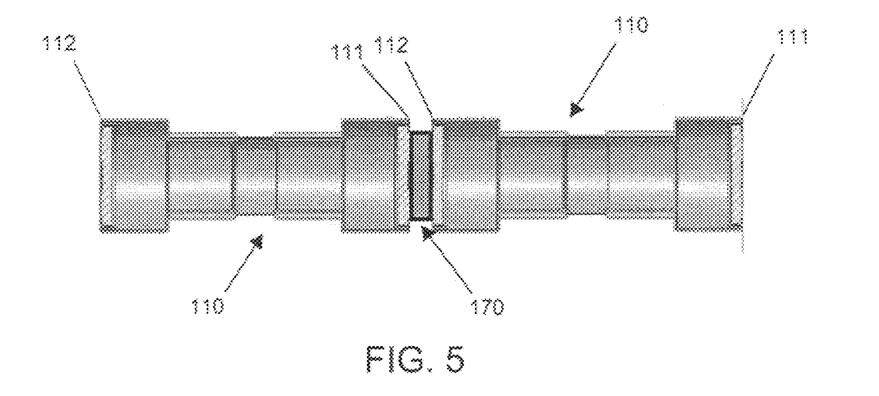
FIG. 5 shows a front view of the present invention featuring base units connected in series.
Figures 6A, 6B:
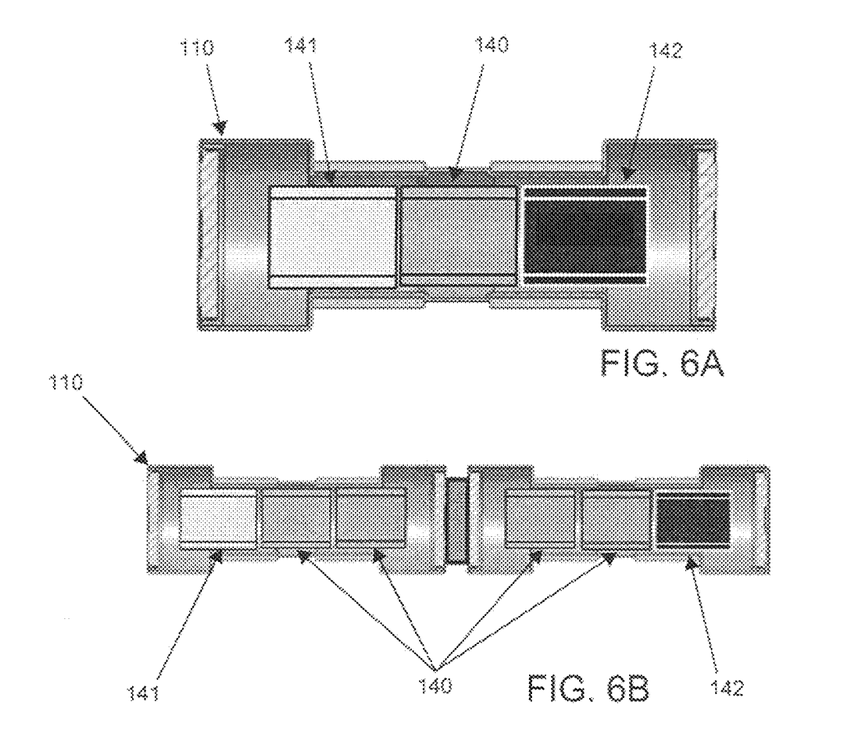
FIG. 6A shows a cross-sectional view of the present invention featuring the power storage component, the solar controller, and the power inverter in the base cavity.
FIG. 6B shows a cross-sectional view of the present invention featuring base units connected in series with multiple power storage components, the solar controller, and the power inverter in the base cavity.
Figure 12:
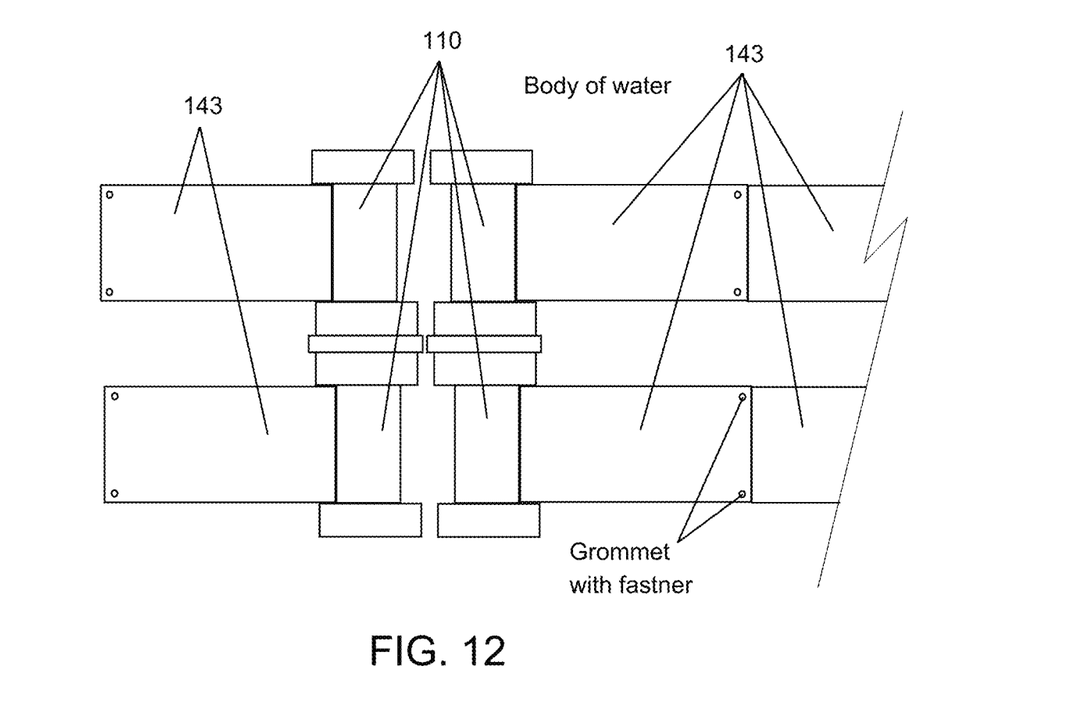
FIG. 12 shows an overhead view of an alternate embodiment of the present invention featuring a first row of multiple base units connected in series, a second row of multiple base units connected in series and further connected to the first row of multiple base units forming a grid, and a third row of multiple base units connected in series and further connected to the second row of multiple base units via the solar panels expanding the grid.
Figure 13:
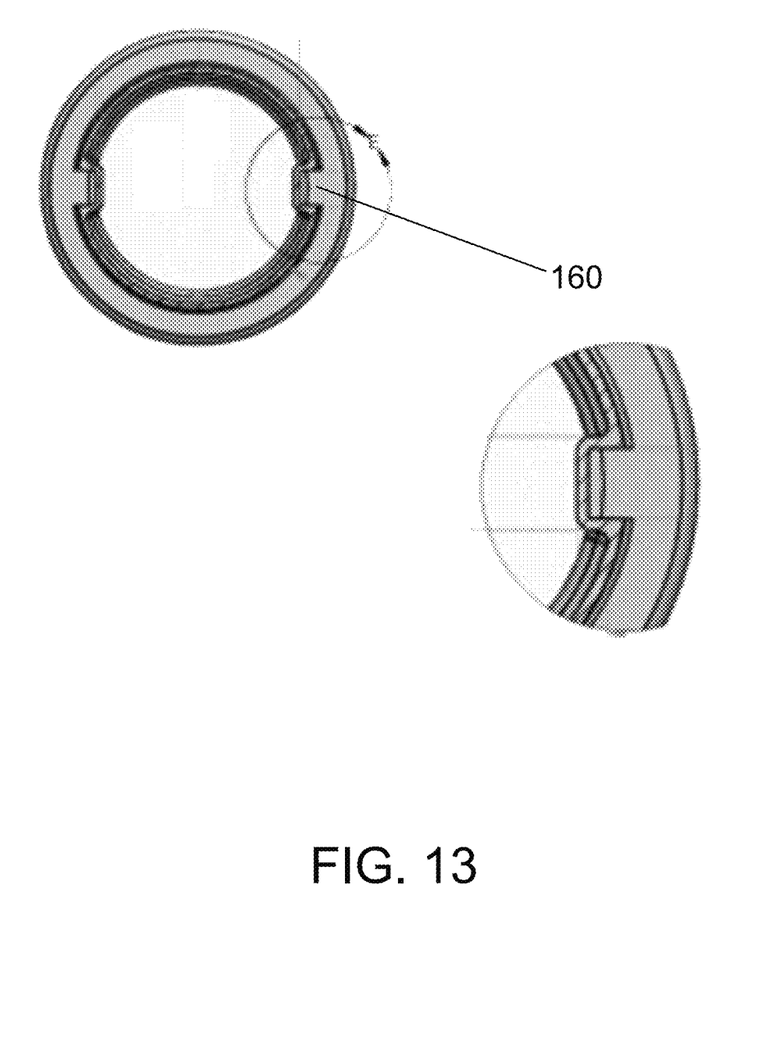
FIG. 13 showing a cross section of the invention detailing the rail (160).

In some embodiments, when a plurality of base units (110) is joined together, a plurality of solar panels (143) and a plurality of power storage components (140) are used, while a single solar controller (141) and a single power inverter (142) are used to optimize the capacity of the system. In some embodiments, any number of base units (110) of the system can be joined together in a series forming a row to expand the system. In some embodiments, any number of rows of base units (110) joined in a series can be joined together forming a grid to expand the system. In some embodiments, the grid is placed on a structure, on land, or floats on a surface of a body of water. In some embodiments, base units (110) can be joined together on the base unit first end (111) or the base unit second end (112). In some embodiments, base units (110) can be joined together on the base side walls (114) via straps, connectors or other means of attachment. In some embodiments, solar panels (142) contain strategically placed grommets near edges and corners for anchoring or fastening to other solar panels (142) via fasteners through the grommets.

In some embodiments, the double-sided end cap comprises electrical connectors which are mated when the double-sided end cap is used to join base units. In some embodiments, the double sided end cap mates the electrical outputs of the base units (110) in parallel. In some embodiments, the double sided end cap mates the electrical outputs of the base units (110) in series.

In some embodiments, the solar panel (143) is constructed from thin film amorphous silicon cells. In some embodiments, the solar panel (143) comprises gold nanocluster solar technology. In some embodiments, the solar panel (143) comprises organic photovoltaics. In some embodiments, the solar panel (143) comprises perovskite crystals and or perovskite solar cells. In some embodiments, the solar panel (143) comprises monocrystalline or polycrystalline silicone. In some embodiments, the solar panel (143) comprises CIGS copper indium gallium selenide. In some embodiments, the solar panel (143) comprises layers such as a transparent conducting coating, an antireflective coating, an n-type window layer formed by first semiconductor layer, a junction formed between two semiconductor materials of opposite polarity, a bottom p-type absorber layer formed by second semiconductor material, an ohmic contact, and a substrate. In some embodiments, the solar panel (143) is thin film or flexible.

In some embodiments, the thin film amorphous silicon cells comprise amorphous silicon, amorphous silicon germanium, and nanocrystalline silicon.

Figure 8:
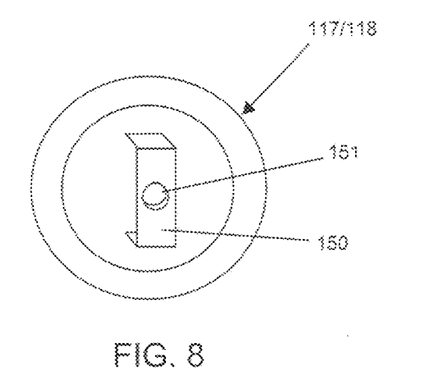
FIG. 8 shows a front view of an end cap of the present invention featuring a mounting handle and a cylindrical cavity.

In some embodiments, the first end cap (117) or the second end cap (118) comprises a mounting handle (150) located on an end surface thereon.

Figure 10:
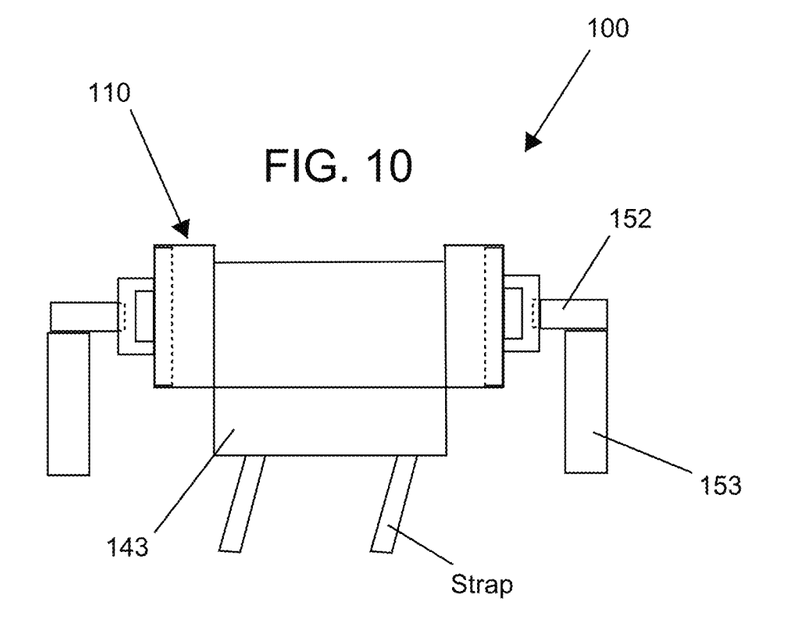
FIG. 10 shows a front view of the present invention featuring the mounting handle, the cylindrical cavity, the axle rod, and the stationary mount.
Figure 11A:
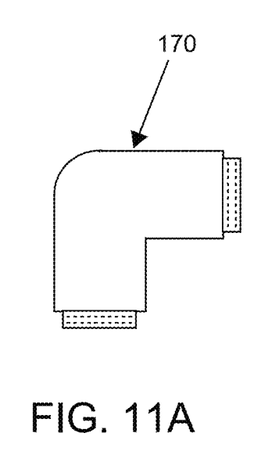
FIG. 11A shows a double-sided end cap for joining two base units in an angled configuration.
Figure 11B:
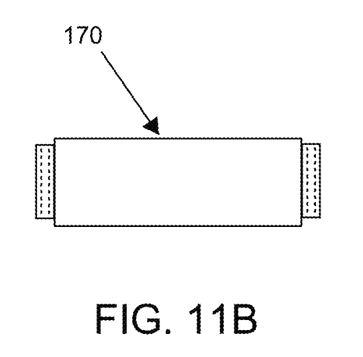
FIG. 11B shows a double-sided end cap for joining two base units in an extended configuration.

In some embodiments, the mounting handle (150) comprises a cylindrical cavity (151) centrally located therein. In some embodiments, the cylindrical cavity (151) is concentrically located with respect to the first end cap (117) or the second end cap (118). In some embodiments, an axle rod (152) is rotatingly located in the cylindrical cavity (151) for easy unrolling of the solar panel (143) from the base unit (110). In some embodiments, the stationary mount (153) is attached to a car, a bench, a table, a platform, or the ground.

In some embodiments, the first end cap (117) comprises a first mounting handle (150) located thereon and the second end cap (118) comprises a second mounting handle (150) located thereon. In some embodiments, a first cylindrical cavity (151) is concentrically located with respect to the first end cap (117). In some embodiments, a second cylindrical cavity (151) is concentrically located with respect to the second end cap (118). In some embodiments, a first axle rod (152) is rotatingly located in the first cylindrical cavity (151) and a second axle rod (152) is rotatingly located in the second cylindrical cavity (151). In some embodiments, the first axle rod (152) and the second axle rod (152) each comprise a stationary mount (153) located thereon for disposing on a planar surface for easy unrolling of the solar panel (143) from the base unit (110).

In some embodiments, the first end cap (117) comprises a first cylindrical cavity (151) concentrically located with respect to the first end cap (117). In some embodiments, a second cylindrical cavity (151) is concentrically located with respect to the second end cap (118). In some embodiments, a first axle rod (152) is rotatingly located in the first cylindrical cavity (151) and a second axle rod (152) is rotatingly located in the second cylindrical cavity (151). In some embodiments, the first axle rod (152) and the second axle rod (152) each comprise a stationary mount (153) located thereon for disposing on a planar surface for easy unrolling of the solar panel (143) from the base unit (110).

Figure 9:
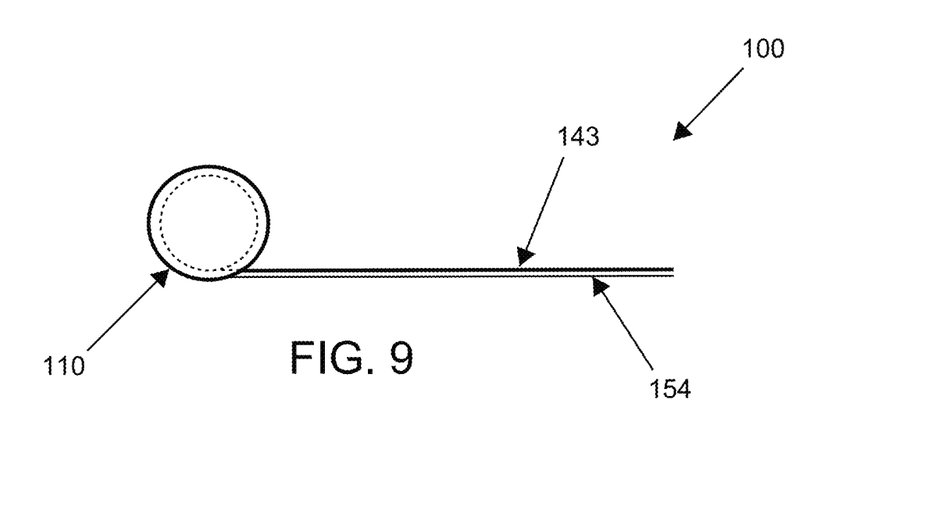
FIG. 9 shows a side view of the present invention featuring the unrolled solar panel and flexible pad.

In some embodiments, a flexible pad (154) is located on a back side of the solar panel (143) for protection of the surface when rolling the solar panel (143) onto the base unit (110).

In some embodiments, the flexible pad (154) is buoyant. In some embodiments, the flexible pad (154) ensures the solar panel (143) is buoyant and floats on water.

In some embodiments, the flexible pad (154) comprises a choice of colors and fabrics.

In some embodiments, internal padding is used to ensure safety and reliability of the power storage component (140), the solar controller (141), and the power inverter (142).

In some embodiments, an internal heat sink layer is used and is constructed from metal. In some embodiments, the metallic heat sink layer lines the inside of the cylinder to serving two purposes. One is to keep the ambient temperatures down, and two to serve as a faraday cage which protects the interior electrical components from damage from outside electromagnetic energy, basically, a metal lining surrounding the internal components. In some embodiments, the heat sink comprises pyrolytic graphite.

The solar controller is also known as the generic name, "Charge Controller" or MPPT charge controller. The charge controller has multiple outputs. In some embodiments, the system (100) comprises one or more fuses located in-line between components. In some embodiments, a fuse can be located between any, all, or none of the components. Fuses and their use are well known to those of ordinary skill in the art.

In some embodiments, to ensure safety and reliability, o-rings and seals are used to seal openings and connections. In some embodiments, a seal is located on both threaded caps in the form of an o-ring or similar to environmentally protect the inside components from water, dust, etc.

In some embodiments, the base unit (110) comprises one or more straps and D-rings for ease of carrying. In some embodiments, the straps and D-rings are used for carrying the system (100) like a backpack on a back or over a shoulder of a user.

In some embodiments, the base unit (110) comprises one or more meters disposed thereon for displaying photovoltaic input, battery levels, etc. In some embodiments, one or more meters are operatively connected to the power storage component (140), the solar controller (141), the power inverter (142), or the solar panel (143) for indication.

Figure 7A:
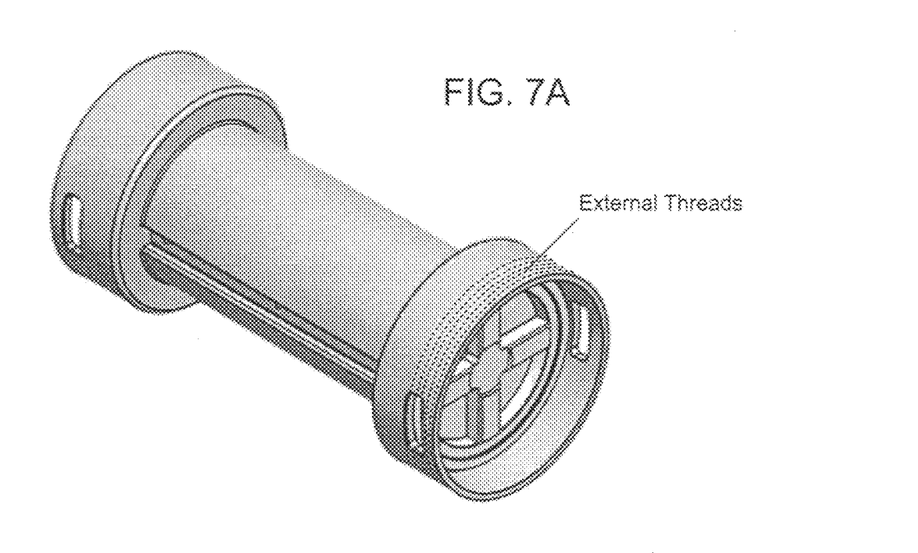
FIG. 7A shows a perspective view of an alternate embodiment of the present invention featuring an extended lip on the ends of the base, an integrated handle on the extended lip, and no cable notch.
Figures 7B, 7C:
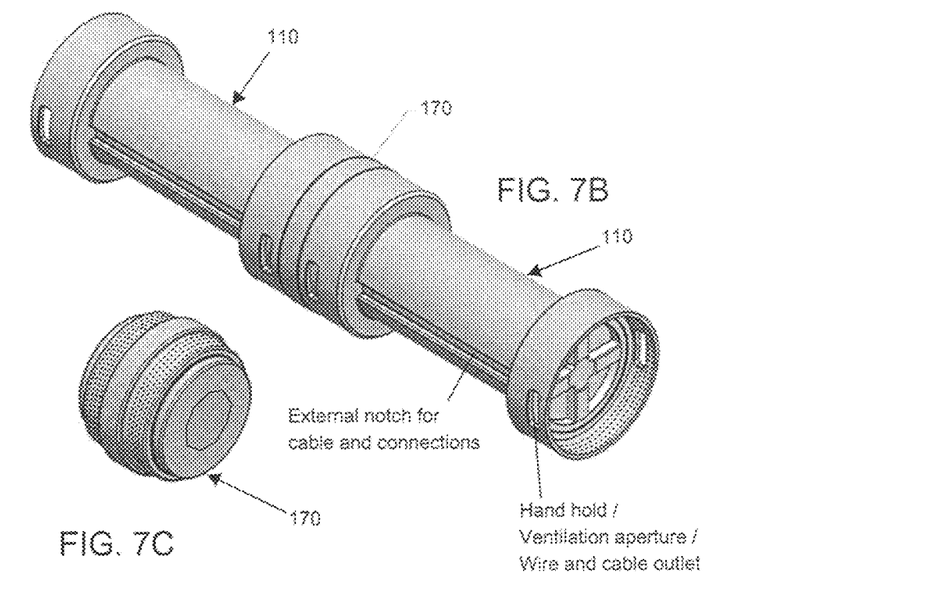
FIG. 7B shows a perspective view of an alternate embodiment of the present invention featuring base units connected in series via a double-sided end cap.
FIG. 7C shows a double-sided end cap for joining two base units.

In some embodiments, the base unit comprises an extended lip on the base first end (111) and the base second end (112) for protecting the ends of the base. In some embodiments, the base unit (110) comprises an integrated handle on the extended lip. In some embodiments, the extended lip provides protection to the edges of the first end cap (117) and the second end cap (118) by extending past the outer surface of the caps.

In some embodiments, the present invention is weatherproof. In some embodiments, the present invention is shock proof. In some embodiments, the present invention is customizable. In some embodiments, the present invention is expandable. In some embodiments, the present invention is marine grade. In some embodiments, the present invention floats—both the base and the solar panel. In some embodiments, the present invention is portable. In some embodiments, the present invention comprises a variety of mounting solutions, having a universal mounting system. In some embodiments, the present invention is durable, for example, the unit can withstand a falling tree.

In some embodiments, the large diameters of the base first end (111) and the base second end (112) protect the photovoltaic panel and act as wheels allowing easy transport and rapid deployment. In some embodiments, the small diameters of the panel notch (135) allow mounting of flexible photovoltaic cells with connection cables in the smallest diameter cable notch (130) or center notch. O-rings ensure internal contents of the system (100) are environmentally protected. Simple lightweight legs allow easy access to internal electronics and ensure proper cooling.

In some embodiments, hook and loop straps keep the photovoltaic panel secure while multiple D-rings allow attachments such as carry straps. The straps can be quickly undone while the housing is rolled to deploy various lengths of thin film solar panels. In some embodiments, a rapid deployment system comprises a flexible, thin film solar panel mounted onto a watertight electrical housing which ensures various forms of electrical equipment are safe from the elements and ready to use any time.

In some embodiments, the present invention is useful in many industries and for many uses, for example, agriculture, livestock, crops, water treatment, desalinization, plumbing, filtration, mining, sluicing, cooling machinery, military, U.A.V.'s and robotics, emergency kits, communication devices, optics, metal detection, security equipment, film and photography, textiles, tankless scuba, transport, farm equipment, wood mills, wireless charging, heating, cooling, welding, electric fences, parties and festivals, sailing, logging, aquaponics, industrial, climate control, scientific study, exploration, cabins and off grid living, and space travel.

In some embodiments, external threads are located on the base first end (111) or the base second end (112). In some embodiments, internal threads are located on the base first end (111) or the base second end (112). In some embodiments, a hand hold is located on the base first end (111) or the base second end (112). In some embodiments, a hand hold is an aperture located on the base first end (111) or the base second end (112). In some embodiments, the hand hold provides ventilation during operation of the system when the base unit (110) is placed in an upright position. In some embodiments, the hand hold provides an aperture for cables (144) and wires to pass through when the base unit (110) is placed in an upright position.

In some embodiments, linear grooves located on the base side wall (114) are used for cables (144), wires, and connectors for the system (100) to lie within.

In some embodiments, the system (100) comprises foam pockets located in the base unit cavity (115) for encasing components to aid in shock absorption. In some embodiments, the system (100) comprises foam lining within the base unit cavity (115). In some embodiments, the system (100) comprises foam inserts in the base unit cavity (115) to aid in shock absorption. In some embodiments, a fabric sealant is applied to any woven or fabric components of the system (100) such as straps, etc. In some embodiments, the straps are attachable and detachable. In some embodiments, a hook and loop system is used for temporary attachment of the straps. In some embodiments, a high-density hook and loop system is used for temporary attachment of the straps. In some embodiments, anchors are used to secure the system (100) from wandering when used on a body of water. In some embodiments, the solar panel (143) comprises protective caps located thereon. In some embodiments, the system (100) comprises metal shackles for connections.

In some embodiments, socket connections are used for connecting components, cables (144) and wires and can be connected and disconnected easily a large number of times. In some embodiments, rotating electrical connections are used for connecting components, cables (144) and wires. In some embodiments, socket connections are used for connections on the base unit (110) rather than threaded connections. In some embodiments, a compressions seal system is used for connections on the base unit (110) rather than threaded connections.

In some embodiments, a pin system is used for interlocking components to limit rotation, for example, between the first end cap (117) and the base first end (111), the second end cap (118) and the base second end (112), the base first end (111) or the base second end (112) and ends of the double sided end cap (170). In some embodiments, the pin system is used for interlocking components to limit rotation including electrical connections and other rotatable fittings. In some embodiments, a pin system is used for interlocking components to limit rotation, for example when using the stationary mount (153).

In some embodiments, the system (100) comprises a chemically-applied floatation means located therein or thereon. In some embodiments, the system (100) is constructed from corrosion-resistant materials. In some embodiments, the system (100) is constructed from materials that are compatible for use in an around seawater, for example, marine-grade.

In some embodiments, clips are used to route wires and cables (144) in an orderly fashion. In some embodiments, clips are used to fasten components, such as the power storage component (140), the solar controller (141), and the power inverter (142) securely into place inside the base cavity (115). In some embodiments, power outlets, connection ports, and the like comprise dust and moisture covers sealably located there over. In some embodiments, the base unit (110) comprises an inspection port having an inspection port cover located thereon and fluidly connected to the base cavity (115). In some embodiments, the inspection port cover seals the inspection port. In some embodiments, the inspection port cover seals the inspection port via a compression sealing means.

In some embodiments, labels and signs are embossed on an exterior surface of the base unit (110), for example, warning, electrical hazard, etc. In some embodiments, the system (100) comprises animal and pest deterrents, for example, chemical deterrents, noise deterrents, physical deterrents, electrical shock deterrents, etc. In some embodiments, the system (100) comprises removable straps located thereon for easy transport of the system (100).

In some embodiments, the system (100) comprises one or more sensors operatively attached thereto, for example, a diagnostic sensor for the components, a temperature sensor, a humidity sensor, a gas sensor, a pressure sensor, and the like. In some embodiments, the system (100) comprises a timer operatively connected thereto. In some embodiments, the system (100) comprises a variety of power ports located therein. In some embodiments, the system (100) comprises a junction box having a bypass diode located therein. In some embodiments, the solar panel (143) comprises a connecting block having ports for connecting the cables (144) thereto. In some embodiments, the system (100) comprises a dehumidifier operatively connected to the system (100) and located in the base cavity (115) therein. In some embodiments, the system (100) comprises a wireless energy system. In some embodiments, the system (100) comprises radio equipment operatively connected thereto and located in the base cavity (115). In some embodiments, the system (100) comprises a WiFi transmitter operatively connected thereto and located in the base cavity (115). In some embodiments, the system (100) comprises a radio frequency tuner operatively connected thereto and located in the base cavity (115). In some embodiments, the system (100) comprises conical coils operatively connected thereto and located in the base cavity (115). In some embodiments, the system (100) comprises global positioning system equipment operatively connected thereto and located in the base cavity (115). In some embodiments, the system (100) comprises satellite communication equipment operatively connected thereto and located in the base cavity (115).

In some embodiments, the system (100) comprises a metal lining located within the base cavity (115) for minimizing electromagnetic disturbance. In some embodiments, the system (100) comprises a Faraday cage located within the base cavity (115) for minimizing electromagnetic disturbance. In some embodiments, an alternating current (AC) induction motor is located within the base cavity (115) and operatively connected to the system (100) for providing power for a ventilation fan. In some embodiments, a direct current (DC) motor is located within the base cavity (115) and operatively connected to the system (100) for providing power for a ventilation fan. In some embodiments, a central processing unit is located within the base cavity (115) and operatively connected to the system (100). In some embodiments, an air compressor is located within the base cavity (115) and operatively connected to the system (100) for providing a compressed air supply. In some embodiments, a hydraulic pump and system is located within the base cavity (115) and operatively connected to the system (100) for providing a hydraulic fluid supply. In some embodiments, an oscillator is located within the base cavity (115) and operatively connected to the system (100).

In some embodiments, the base unit (110) is symmetrical. In some embodiments, the base unit (110) is asymmetrical. In some embodiments, the base side wall (114) is symmetrical. In some embodiments, the base side wall (114) is asymmetrical. In some embodiments, when connecting base units (110) within a series, the base unit (110) serves as a storage compartment or a flotation device. In some embodiments, the connections from the solar panel 143) pass through a port on the base unit side wall (114) rather than the openings on the base unit first end (111) or the base unit second end (112).

In some embodiments, an aperture is located in the first end cap (117), the second end cap (118), and the center of the double-sided end cap (170). In some embodiments, an aperture cap is sealably and removably located over the aperture, for example, a cap within a cap. In some embodiments, the first end cap (117) or the second end cap (118) comprises a smooth, aerodynamic shape located on an exterior surface thereon to minimize air or water resistance. In some embodiments, a pressure relief aperture is located in the base unit (110) and fluidly connected to the base cavity (115). In some embodiments, a pressure regulator is located in the pressure relief aperture for controlling pressure inside the base cavity (115).

In some embodiments the system (100) comprises PALS webbing located thereon used for MOLLE compatible equipment. In some embodiments, the system (100) is MOLLE compatible equipment. In some embodiments the solar panel (143) comprises PALS webbing located thereon. In some embodiments the base unit (110) comprises PALS webbing located thereon.

In some embodiments, the solar panel (143) rolls and unrolls. In some embodiments, the solar panel (143) folds and unfolds, rolls and unrolls for compaction. In some embodiments, the system (100) comprises a float connected thereto.

In some embodiments, the system (100) comprises a water filtration system disposed in the base cavity (115) and operatively connected thereto. In some embodiments, the system (100) comprises a water desalinization system disposed in the base cavity (115) and operatively connected thereto. In some embodiments, the system (100) comprises a climate control system operatively connected thereto for controlling heating and air conditioning for a room.

In some embodiments, the system (100) comprises an alternator disposed in the base cavity (115) and operatively connected thereto. In some embodiments, the alternator can have any amount of windings. In some embodiments, the alternator may be a one, two or three-phased alternator. In some embodiments, the system (100) comprises an electric vehicle charging connector, socket, or port disposed in the base cavity (115) and operatively connected thereto. In some embodiments, the system comprises a transformer disposed in the base cavity (115) and operatively connected thereto for reducing or increasing voltage of an alternating current.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A solar energy system (100) for portably providing solar energy, wherein the system (100) comprises:
   (a) a base unit (110) having a base cavity (115) disposed therein, wherein the base unit (110) comprises a cable notch (130) and an annular panel notch (135) disposed on a base side wall (114) wherein a base first end (111) or a base second end (112) comprises an opening disposed therein, wherein the opening comprises a first end cap (117) or a second end cap (118) disposed thereon;
   (b) a solar panel (143), wherein the solar panel (143) is wrapped around the panel notch (135) of the base unit (110), wherein the solar panel (143) is operatively connected to a solar controller (141), a power inverter (142), and a power storage component (140) via cables (144);
   (c) the power storage component (140) disposed in the base cavity (115);
   (d) the solar controller (141) disposed in the base cavity (115) operatively connected to the power storage component (140), and the power inverter (142), capable of regulating the current and voltage delivered to the power storage component (140); and
   (e) the power inverter (142) disposed in the base cavity (115) operatively connected to the solar controller (141);
   wherein for operation, the first end cap (117) or the second end cap (118) is loosened or removed for ventilation and connective access, wherein the solar panel (143) is unrolled from the base unit (110) and placed in contact with sunlight to receive energy from the sun, wherein the solar panel (143) converts the energy from the sun to an electrical current, wherein the solar panel (143) is connected to the solar controller (141) via the cables (144), wherein the solar controller regulates current flowing to the power storage component (140), wherein an electrical current output from the power storage component (140) is regulated via the solar controller (141), wherein the solar controller is connected to the power inverter (142), wherein the power inverter converts the current into alternating current, wherein an energy using device is connected to the power inverter (142) for power usage,
   wherein for storage, the cables (144) are detached from the power inverter (142) and wrapped around the cable notch (130) of the base unit (110), wherein the solar panel (143) is wrapped around the panel notch (135) of the base unit (110), wherein the solar panel (143) is secured in place around the base unit (110), wherein the first end cap (117) or the second end cap (118) is replaced.

2. The system of claim 1, wherein the base unit (110) is cylindrical.

3. A solar energy system (100) for portably providing solar energy, wherein the system (100) comprises:
   (a) a tubular base unit (110) having a base first end (111), a base second end (112), a base midpoint (113) between the base first end (111) and the base second end (112), a base side wall (114), and a base cavity (115) disposed therein, wherein the base cavity (115) comprises a plurality of elevated rails (160) disposed therein, wherein the base unit (110) comprises a first diameter (116) at both the base first end (111) and the base second end (112), wherein the base unit (110) comprises an annular cable notch (130) comprising a cable notch diameter (131) disposed on the base side wall (114), wherein the cable notch (130) is disposed at the base midpoint (113), wherein the base unit (110) comprises a plurality of annular panel notches (135), each comprising a panel notch diameter (136) disposed on the base side wall (114), wherein a first panel notch (135) is disposed between the base first end (111) and the cable notch (130), wherein a second panel notch (135) is disposed between the base second end (112) and the cable notch (130), wherein the base unit (110) is symmetrical, wherein the base first end (111) comprises a first end cap (117) threadably disposed thereon and sealed via an o-ring, wherein the base second end (112) comprises a second end cap (118) threadably disposed thereon and sealed via an o-ring;
   (b) a power storage component (140) disposed in the base cavity (115) via the elevated rails (160) proximal to the base midpoint (113);
   (c) a solar controller (141) disposed in the base cavity (115) via the elevated rails (160) proximal to the base first end (111), wherein the solar controller (141) is operatively connected to the power storage component (140);
   (d) a power inverter (142) disposed in the base cavity (115) via the elevated rails (160) proximal to the base second end (112), wherein the power inverter (142) is operatively connected to the solar controller (141); and
   (e) a flexible solar panel (143), wherein the solar panel (143) is wrapped around the panel notches (135) of the base unit (110), wherein the solar panel (143) is operatively connected to the solar controller (141) via attachable and detachable cables (144);

wherein for operation, the first end cap (117) or the second end cap (118) is loosened or removed for ventilation and connective access, wherein the solar panel (143) is unrolled from the base unit (110) and placed in contact with sunlight to receive energy from the sun, wherein the solar panel (143) converts the energy from the sun to an electrical current, wherein the solar panel (143) is connected to the solar controller (141) via the cables (144), wherein the solar controller regulates current flowing to the power storage component (140), wherein an electrical current output from the power storage component (140) is regulated via the solar controller (141), wherein the solar controller is connected to the power inverter (142), wherein the power inverter converts the current into alternating current, wherein an energy using device is connected to the power inverter (142) for power usage, wherein for storage, the attachable and detachable cables (144) are detached from the power inverter (142) and wrapped around the cable notch (130) of the base unit (110), wherein the solar panel (143) is wrapped around the panel notches (135) of the base unit (110), wherein the solar panel (143) is secured in place around the base unit (110), wherein the first end cap (117) and the second end cap (118) are sealably tightened.

4. The system of claim 3, wherein the system (100) further comprises a stand, wherein the stand is disposed on the base first end (111) or the base second end (112) to stably elevate the base unit (110) offset from a surface for ventilation.

5. The system of claim 3, wherein a threaded shoulder of the base first end (111) or the base second end (112) comprises a venting aperture disposed therein, wherein upon partial unscrewing of the first end cap (117) or the second end cap (118) the venting aperture allows airflow into and out of the base cavity (115).

6. The system of claim 3, wherein a first base unit (110) and a second base unit (110) are sequentially joined via a double-sided end cap (170), wherein the double-sided end cap (170) comprises first side external threads and second side external threads, wherein the external threads are mated to internal threads disposed on the base first end (111) or the base second end (112), wherein an unlimited number of base units (110) may be joined via double-sided end caps (170), wherein cables (144) may connect systems via a cap aperture disposed in the double-sided end cap (170).

7. The system (100) of claim 3, wherein the solar panel (143) is constructed from thin film amorphous silicon cells.

8. The system (100) of claim 7, wherein the thin film amorphous silicon cells comprise amorphous silicon, amorphous silicon germanium, and nanocrystalline silicon.

9. The system (100) of claim 3, wherein the first end cap (117) or the second end cap (118) comprises a mounting handle (150) disposed on an end surface thereon.

10. The system (100) of claim 9, wherein the mounting handle (150) comprises a cylindrical cavity (151) centrally disposed therein, wherein the cylindrical cavity (151) is concentrically disposed with respect to the first end cap (117) or the second end cap (118), wherein an axle rod (152) is rotatably disposed in the cylindrical cavity (151) for easy unrolling of the solar panel (143) from the base unit (110).

11. The system (100) of claim 3, wherein the first end cap (117) comprises a first mounting handle (150) disposed thereon and the second end cap (118) comprises a second mounting handle (150) disposed thereon, wherein a first cylindrical cavity (151) is concentrically disposed with respect to the first end cap (117), wherein a second cylindrical cavity (151) is concentrically disposed with respect to the second end cap (118), wherein a first axle rod (152) is rotatably disposed in the first cylindrical cavity (151) and a second axle rod (152) is rotatably disposed in the second cylindrical cavity (151), wherein the first axle rod (152) and the second axle rod (152) each comprise a stationary mount (153) disposed thereon for disposing on a planar surface for easy unrolling of the solar panel (143) from the base unit (110).

12. The system (100) of claim 3, wherein the first end cap (117) comprises a first cylindrical cavity (151) concentrically disposed with respect to the first end cap (117), wherein a second cylindrical cavity (151) is concentrically disposed with respect to the second end cap (118), wherein a first axle rod (152) is rotatably disposed in the first cylindrical cavity (151) and a second axle rod (152) is rotatably disposed in the second cylindrical cavity (151), wherein the first axle rod (152) and the second axle rod (152) each comprise a stationary mount (153) disposed thereon for disposing on a planar surface for easy unrolling of the solar panel (143) from the base unit (110).

13. The system (100) of claim 3, wherein a flexible pad (154) is disposed on a back side of the solar panel (143) for protection of the surface when rolling the solar panel (143) onto the base unit (110).

14. The system (100) of claim 13, wherein the flexible pad (154) is buoyant, wherein the flexible pad (154) ensures the solar panel (143) is buoyant and floats on water.

15. The system (100) of claim 13, wherein the flexible pad (154) comprises a choice of colors and fabrics.

* * * * *